United States Patent
Schwartz et al.

(10) Patent No.: US 12,456,831 B2
(45) Date of Patent: Oct. 28, 2025

(54) MULTI-PART SENSING ELECTRODE CONNECTOR

(71) Applicant: XEROX CORPORATION, Norwalk, CT (US)

(72) Inventors: David Eric Schwartz, Concord, MA (US); David K Biegelsen, Portola Valley, CA (US); Ping Mei, San Jose, CA (US)

(73) Assignee: XEROX CORPORATION, Norwalk, CT (US)

( * ) Notice: Subject to any disclaimer, the term of this patent is extended or adjusted under 35 U.S.C. 154(b) by 1052 days.

(21) Appl. No.: 17/499,216

(22) Filed: Oct. 12, 2021

(65) Prior Publication Data
US 2023/0116242 A1    Apr. 13, 2023

(51) Int. Cl.
| | | |
|---|---|---|
| A61B 5/00 | (2006.01) | |
| A61B 5/1477 | (2006.01) | |
| A63B 71/08 | (2006.01) | |
| G01N 27/327 | (2006.01) | |
| H01R 12/78 | (2011.01) | |
| H01R 13/20 | (2006.01) | |

(52) U.S. Cl.
CPC ........... *H01R 12/78* (2013.01); *A61B 5/1477* (2013.01); *A61B 5/682* (2013.01); *G01N 27/3275* (2013.01); *H01R 13/20* (2013.01); *A63B 71/085* (2013.01)

(58) Field of Classification Search
CPC ........ H01R 12/78; H01R 13/20; H01R 12/65; A61B 5/682; A61B 5/1477; G01N 27/3275; A63B 71/085; A63B 2230/08
See application file for complete search history.

(56) References Cited

U.S. PATENT DOCUMENTS

| | | | |
|---|---|---|---|
| 7,137,736 B2 | 11/2006 | Pawloski et al. | |
| 10,141,668 B1 | 11/2018 | Mei et al. | |
| 2015/0305671 A1* | 10/2015 | Yoon | A61B 5/01 600/28 |
| 2023/0030704 A1* | 2/2023 | Weinstein | A61B 5/682 |

FOREIGN PATENT DOCUMENTS

JP    6687790 B1 *   4/2020   ........... H01R 12/707

OTHER PUBLICATIONS

JP-6687790-B1 English Language Translation (Year: 2020).*
http://web.archive.org/web/20210422182128/https://en.wikipedia.org/wiki/Zero_insertion_force, cached on Apr. 22, 2021.

* cited by examiner

*Primary Examiner* — Curtis A Kuntz
*Assistant Examiner* — Jerold B Murphy
(74) *Attorney, Agent, or Firm* — Leonid Kisselev

(57) ABSTRACT

A thin form of an electrical connector for creating a detachable connection between two circuit elements is disclosed. When the connector is employed, only an outer electrode present on a portion of the connector is exposed to the ambient environment and the rest of the electronics of both the connector and of a device into which the device is integrated can be insulated from the ambient environment. The parts of the connector can create a small three-dimensional interlock structure to seal off contact area and to facilitate electrical contacts between two circuit elements. The connector structure is flexible, allowing the connector to be embedded into a curved surface of a device that can use the electrode exposed to the environment to obtain data regarding the environment.

20 Claims, 7 Drawing Sheets

MULTI-PART SENSING ELECTRODE CONNECTOR

This invention was made with government support under Contract No. FA8650-15-2-5401 awarded by Air Force Research Laboratory. The government has certain rights in the invention.

FIELD

This application relates in general to electronics, and in particular, to a multi-part sensing electrode connector.

BACKGROUND

Electrical connectors are commonly used to connect various parts of electronics to form an integrated system, including systems used to sense data regarding an ambient environment. In some integrated systems, periodic replacement of a connector may be required, such as due to wearing out of connector parts due to exposure to the ambient environment or a need for replacement for an alternative component. A detachable connector such as zero insertion force (ZIF) connector is a type of connector for thin and flexible cable which can be detached and reconnected. With a ZIF socket, a lever on the socket is released and opens a gap so that the contact pads on the cable can be inserted with little force. The lever is then engaged, allowing the contacts to close and grip the contact pads on the flex circuit. ZIF sockets can be used for implementation of a connection in a sensor system that utilizes disposable sensors.

However, many applications in embedded electronic systems pose great challenges that traditional detachable electrical connectors are not always be able to meet. For example, frequently, for a detachable connector to be used, the connector must be thin enough to fit within the system into which the connector needs to be embedded and flexible enough to be embedded into a curved host structure. Further, as detachable connectors must often be used in areas where exposure of the ambient environment, such as an environment that includes liquids, would be harmful to the internal electronics of the system, such connectors must be sealable to prevent the exposure. This characteristic is especially important for systems used within a human body, where damage to electrical contacts could cause electrical damage to the surrounding human tissue. Finally, to make them practicable for a large number of applications, such connectors must be low cost and easy to assemble, a requirement which ZIF sockets in particular may not be able to meet.

Attempts have been made to address these challenges. For example, U.S. Pat. No. 10,141,668, issued Nov. 27, 2018, to Mei et al., the disclosure of which is incorporated by reference, discloses a thin form of electrical connection assembly that includes two circuit elements on separate flexible substrates. The detachable connection is implemented through selective deposition of fine patterns of conductive materials and non-conductive and pressure-sensitive adhesive. However, applying such fine patterns of conductive and non-conductive materials complicates the manufacturing of such connectors, limiting their availability and elevating their cost. Likewise, as high-quality adhesives have to be used to make such connection assembly reliable and allow sufficient conductivity in combination with sufficient water-sealing properties between the two parts, the use of such a connection assembly may be prohibitively expensive for certain applications, especially where parts of the connector must be periodically discarded.

Accordingly, there is a need for an easy-to-manufacture electrical connector that can protect internal electronics of a system into which the connector is embedded from ambient environment and that is flexible enough to accommodate various shapes of the system into which the connector is embedded.

SUMMARY

A thin form of an electrical connector for creating a detachable connection between two circuit elements is disclosed. When the connector is employed, only an outer electrode present on a portion of the connector is exposed to the ambient environment and the rest of the electronics of both the connector and of a device into which the device is integrated can be insulated from the ambient environment. The parts of the connector can create a small three-dimensional interlock structure to seal off contact area and to facilitate electrical contacts between two circuit elements. The connector structure is flexible, allowing the connector to be embedded into a curved surface of a device that can use the electrode exposed to the environment to obtain data regarding the environment.

In one embodiment, a multi-part sensing electrode connector is provided. The connector includes an electrode portion and an interconnect portion. The an electrode portion includes: a flexible substrate; one or more electrodes positioned on a side of the flexible substrate that is configured to be exposed to an ambient environment; one or more one electrode traces, one portion of each of the electrode traces connected to one of the 1 electrodes and further portion of that electrode trace positioned on a side of the flexible substrate of the flexible substrate opposite to the side on which the electrodes are positioned; one or more connectors positioned on a flexible substrate opposite side and each shaped to detachably mate to a further connector positioned on an interconnect portion; and an enclosure surrounding the further portion of the electrode traces, wherein the connectors are comprised at least one of within the enclosure and on the enclosure. The interconnect portion includes: a further flexible substrate; one or more of the further connectors positioned on a side of the further flexible substrate; one or more electrically conductive contact structures positioned on the side of the further flexible substrate, wherein the contact structures electrically interface with the further portions of the one or more of the electrode traces when the connectors mate the further connectors; one or more conductive traces, each interfaced to one of the contact structures and further positioned to interface the contact structure to an external device when the interconnect portion and the electrode portion are inserted into the external device; and a further enclosure formed on the side of the further flexible substrate and surrounding the contact structures, wherein the further connectors are comprised at least one of within the further enclosure and on the further enclosure, wherein the enclosure and the further enclosure mate to form an interlock that insulates the further portions of the electrode circuits and the contact structures from the ambient environment when the connectors are mated to the further connector, and wherein the control circuit is configured to sense data regarding the ambient environments via one or more of the electrodes when the connectors are mated to the further connectors.

In a further embodiment, a smart mouth guard with a disposable electrode portion is provided. The smart mouth guard includes a mouth guard and an electrical connector. The mouth guard includes a curve-shaped housing comprising a receptacle shaped to receive an electrical connector and to electrically interface the electrical connector to a control circuit; the control circuit configured to sense electrochemical data via one or more electrochemical electrodes of the electrical connector exposed to an inside of a person's mouth; a microcontroller interfaced to the control circuit and configured to receive the measured data; a wireless transceiver interfaced to the microcontroller and configured to transmit the sensed data to an remote device. The electrical connector includes an electrode portion and interconnect portion. The electrode portion includes a flexible substrate; one or more electrochemical electrodes positioned on a side of the flexible substrate that is configured to be exposed to an ambient environment; one or more one electrode traces, one portion of each of the electrode traces connected to one of the electrochemical electrodes and further portion of that electrode trace positioned on a side of the flexible substrate opposite to the side on which the electrochemical electrodes are positioned; and one or more connectors positioned on the flexible substrate opposite side and each shaped to detachably mate to a further connector positioned on an interconnect portion; and an enclosure surrounding and the another portion of the electrode traces, wherein the connectors are comprised at least one of within the enclosure and on the enclosure. The interconnect portion includes a further flexible substrate; one or more of the further connectors positioned on a side of the further flexible substrate; one or more electrically conductive contact structures positioned on the further flexible substrate side, wherein the contact structures electrically interface with the further portions of the one or more of the electrode traces when the connectors mate the further connectors; one or more conductive traces, each interfaced to one of the contact structures and further positioned to interface the contact structure to a control circuit when the interconnect portion is integrated into the receptacle; a further enclosure formed on the further flexible substrate side and surrounding the contact structures, wherein the further connectors are comprised at least one of within the further enclosure and on the further enclosure, wherein the enclosure and the further enclosure mate to form an interlock that insulates the further portions of the electrode circuits and the contact structures from the ambient environment when the connectors are mated to the further connector.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

While the descriptions below and accompanying FIGURES include particular dimensions, in a further embodiment, the parts of the multi-part connector described below could have other dimensions.

Figure 1:
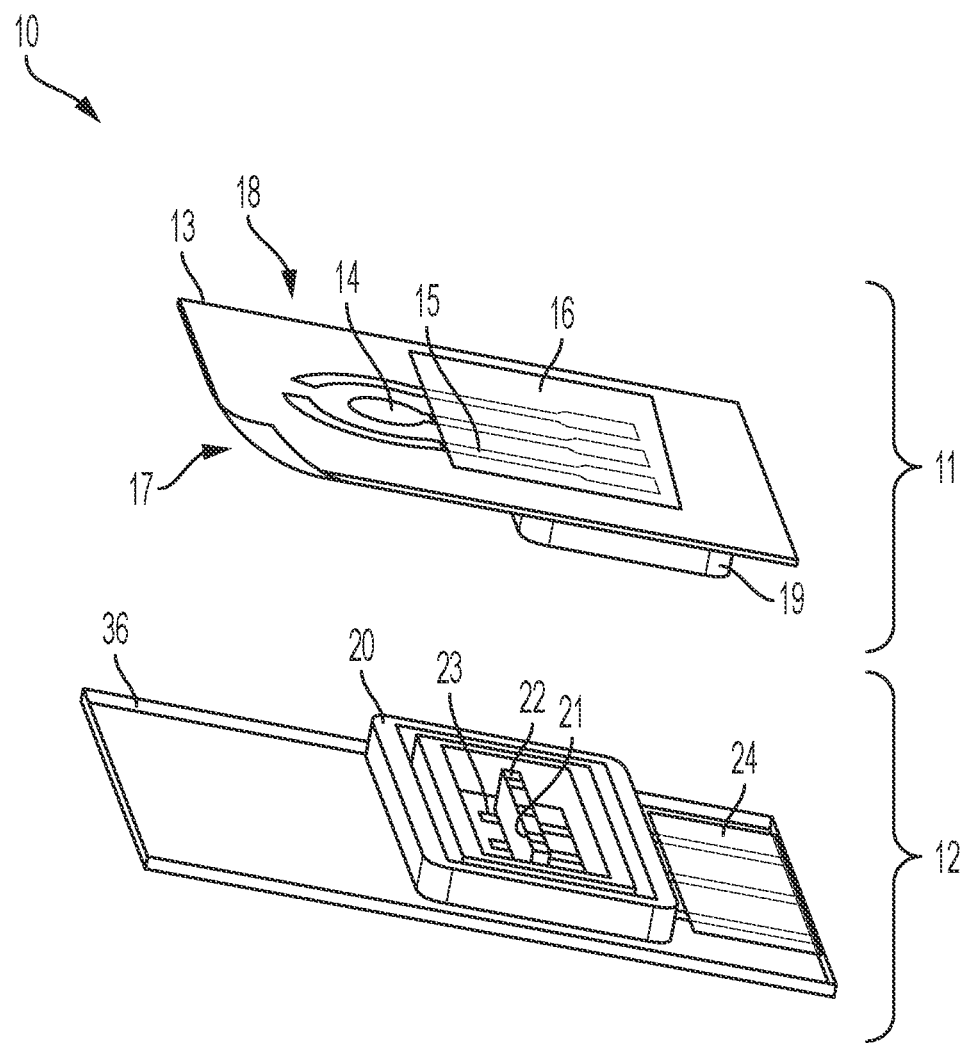
FIG. 1 is a diagram of a multi-part sensing electrode connector in accordance with one embodiment.

FIG. 1 is a diagram of a multi-part sensing electrode connector 10 in accordance with one embodiment. The connector includes two components: a sensor tag 11 (also referred to as an electrode portion 11 below) and an interconnect portion 12. As further described below, the electrode portion 11 could be disposable after a single use while the interconnect portion could be reusable multiple times. The electrode portion 11 includes a thin, flexible substrate 13, which can be made of a material such as plastic, though other kinds of materials are possible. The flexible material of the substrate 13 allows the electrode portion 11 to adopt a curved shape that would allow the electrode portion 11 to be inserted into a curved housing of a sensor into which the electrode portion 11 needs to be embedded, as further described below. The flexible material of the substrate 13 also allows the electrode portion to be more easily removed when inserted into a host system (such as a monitoring devices, though other devices external to the connector or combination of such devices are possible) by peeling the electrode portion 11 back. Similarly, the substrate 36 of the interconnect portion 12 is similarly made of a flexible material (such as plastic, though other materials are possible) that allows the interconnect portion to fit into curved receptacles which integrate the connector 10 into an electrical system.

On one side of the substrate 13 are positioned one or more electrodes 14 (also referred to as "sensor electrodes 14), though which sensing of characteristics of the ambient environment can be conducted. In one embodiment, the electrodes 14 can be electrochemical electrodes that can measure chemical concentration within the ambient environment, such as presence and concentration of particular biomarkers if inserted into the human body (such as the human mouth as described below), though other kinds of electrodes are also possible. Each of the electrodes 14 is connected to an electrode trace 15, with each electrode 14 and the electrode trace connected to that electrode 14 being electrically insulated from other electrodes 14 and the electrode traces 15 connected to those electrodes 14. The entirety of the traces 15 positioned on the top side 18 of the electrode layer 11 are covered with a protection layer 16 that insulates the traces 15 from the ambient environment. The protection layer 16 is made of a non-electrically-conductive material, such as non-electrically-conductive plastic, though other materials are also possible.

The electrode traces 15 pass through the substrate 13 and come out on the side 17 of the substrate 13 opposite to the side 18 on which the electrodes 14 are. A portion of the electrode traces on the opposite side can be adhered to the surface of the opposite side 17 with a cover layer (shown below) that helps maintain the position of the electrode trace 15; however, a portion of each of the electrode traces are also exposed on the opposite surface 17 in a position to interface (directly or indirectly) with the contact structures 21 on the interconnect portion 12. As further described below, the portions of the electrode traces 15 that are exposed on the opposite side 17 side can be positioned in a variety of ways and serve to interface the electrodes 14 to a control circuit (such as a potentiostat) that senses the data regarding the ambient environment via contact structures 21 positioned on the interconnect portion 12 the when the electrode portion 11 couples to the interconnect portion 14.

The coupling between the electrode portion 11 and the interconnect portion 12 is accomplished by a mating between an electrode portion enclosure 19 located on the opposite side 17 of the substrate 13 to an interconnect portion enclosure 20 located on the interconnect portion 12. The mating is accomplished by mating of connectors 25 located within the electrode portion enclosure 19 and further connectors 26 located within interconnect portion enclosure 20, shown below beginning with reference to FIG. 2. In one embodiment, the connectors 25 can be located on the structures that make up the enclosure 19, and, alternatively to or in addition to the connectors 25 being on the structures, if multiple structures make up the enclosure 19, the connectors 25 can be between the multiple structures. Likewise, the further connectors 26 can be located on the structures that make up the interconnect portion enclosure 20, and, alternatively to or in addition to the further connectors 26 being on the structures, if multiple structures make up the interconnect portion enclosure 20, the further connectors 26 can be between the multiple structures. In a further embodiment, alternatively or in addition to the connectors 25 being on or between the structures making up the enclosure 19, the connectors could be surrounded by the enclosure 19. Similarly, in a further embodiment, alternatively or in addition to the further connectors 26 being on or between the structures making up the further enclosure 20, the further connectors 26 could be surrounded by the further enclosure 20. Further, while the enclosure 19 and the further enclosure 20 are shown of a particular shape, other shapes of the enclosures are possible as long as the enclosures 19, 20 are able to mate with each other in a way that detachably couples the electrode portion 11 to the interconnect portion 12. As shown below with reference to FIG. 2, the exposed portion of the circuit trace 15 can be surrounded by the enclosure 19. The mating between the enclosures 19, 20 can be done in a way similar to what is described in U.S. Pat. No. 7,137,736, issued Nov. 21, 2006 to Pawloski et al., the disclosure of which is incorporated by reference, though in a further embodiment, other mating mechanisms are possible. The connectors 25 and the further connectors 26 can be coupled and decoupled upon an application of a sufficient force, allowing the connector 10 elements to be separated from each other, and for the electrode portion 11 to be disposable and for the interconnect portion to be reusable.

In addition to mating with the enclosure 19, the further enclosure 20 positioned on the interconnect portion 12 further surrounds electrically conductive contact structures 21 mentioned above, with each contact structure 21 electrically interfacing with the exposed portion of one electrode trace 15 on the opposite side 17 of the electrode portion 11 when the enclosure 19 mates to the enclosure 20. As seen with reference to FIG. 1, the contact structure 21 can be a part of a contact protrusion 22 (which can include multiple structures 21, with each structure 21 contacting an electrode trace 15 connected to a single one of the electrodes 14), though other ways to position the electrically conductive material 21 are possible. The contact structure 21 can be metal, electrically-conductive plastic, electrically conductive rubber, or another electrically conductive material or mixture of electrically conductive materials. A contact structure 21 can be implemented using a variety of materials. For example, a contact structure 21 can be implemented using an electrically conductive (such as metallic) foil. Alternatively, a contact structure 21 can be implemented using an electrically-conductive (such as metallic) coating. Still other materials of which the contact structure 21 can comprise are possible.

The interconnect portion 12 further includes electrically conductive traces 23, with each trace 13 connecting to one of the contact structures 21 (either directly or through another object, such as through electrically conductive portions of the contact protrusion 22). Each conductive trace 23 and the contact structure 21 connected to that trace 23 are electrically insulated from other contact structures 21 and the conductive traces 23 connected to those contact structures. The conductive traces 23 pass through the walls of the further enclosure 20, and run along the surface of the interconnect portion 12. In one embodiment, the conductive traces 23 reach the end of the interconnect portion 12, where they wrap around the edge of the interconnect portion 12 and interface with contacts 39 (shown below with reference to FIGS. 9 and 11) of the host system into which the connector 10 is integrated (when the connector is indeed integrated into that system), with the system contacts electrically interfacing the conductive traces 23 contact structures 21, the electrode traces 15 connected to those contact structures 21, and the electrodes 14 connected to those electrode traces 15 to the control circuit (such as a potentiostat) that can sense characteristics of the ambient environment via the electrodes 14. In a further embodiment, the conductive traces 23 can routed towards the host system contacts 39 in a different way, passing through the interconnect portion 12 using one or more vias. The entirety (or in a further embodiment, a portion) of the conductive traces 23 that is outside of the walls of the further connector and that is not positioned to interface with the host system contacts can also be covered with a protection layer 24 to protect the conductive traces 23 from contact with the ambient environment.

Figure 2:
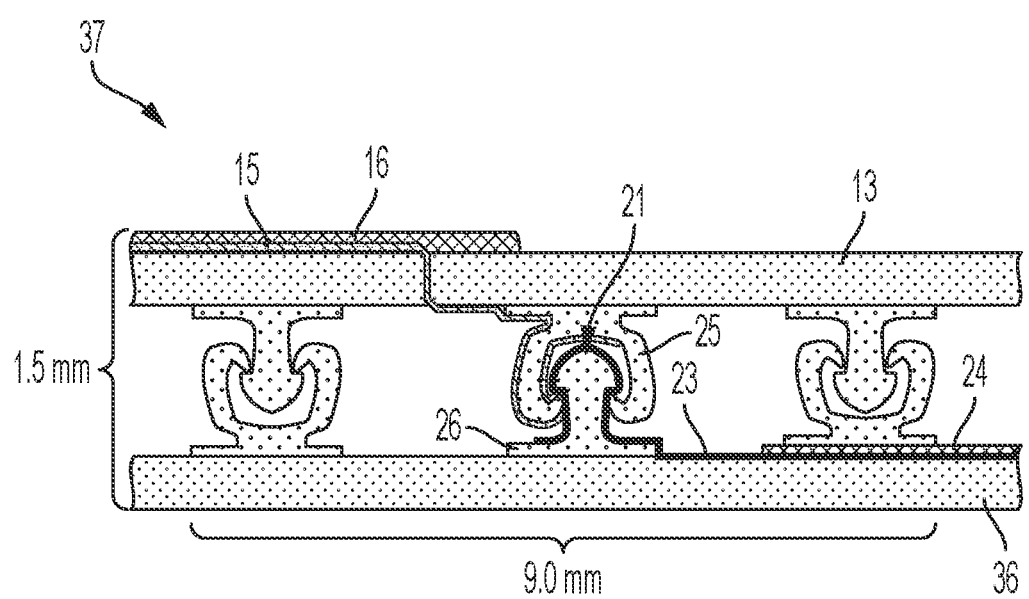
FIG. 2 is a cross-section of the interlock of the multi-part sensing electrode connector 10 of FIG. 1 in accordance with one embodiment.

As mentioned above, the exposed portions of electrode traces 15 can be surrounded by the enclosure 19 and the contact structures can be within the further enclosure 20—when the enclosure 19 and the further enclosure 20 mate, they form an interlock structure that protects the exposed portions of the traces 15 and the contact structures from exposure to the ambient environment. Further, the only electrical components of the connector exposed to the environment are the electrodes 15, thus protecting the electronics of the connector and of any host system from the ambient environment. FIG. 2 is a cross-section of the interlock 37 of the multi-part sensing electrode connector 10 of FIG. 1 in accordance with one embodiment. As mentioned above, the enclosure 19 surrounds one or more connectors 25 that mate one or more further connectors 26 positioned within the further enclosure 20. The further connectors 25 can be integrated as part of the contact protrusion 22, though in a further embodiment, other locations for the further connectors 26 are possible. As can be seen with reference to FIG. 2, the connectors 25 can include a cavity and the exposed portion of an electrode trace 15 can be positioned within that cavity. Likewise, the further connectors 26 can include a protrusion and the contact structure 21 can be wrapped around the protrusion. In this embodiment, the contact structure 21 can be a thin (~10 um) metallic foil wrapped around the protrusion. Other kinds of contact structure 21 are possible. The exposed portion of the trace 15 and the contact structure 21 can be secured within the cavity and the protrusion respectively in a variety of ways. For example, if the exposed trace 15 or the contact structure 21 include metallic foil, they could be glued on to respectively portion of the cavity or the protrusion. For another example, if the exposed trace 15 or the contact structure 21 include a conductive paste, they could be extruded (such as through 3D printing) on respectively the cavity or the protrusion. The same techniques could be used for securing the exposed trace to other surfaces (such as cavities and protrusions) in the embodiments described below. When the protrusion enters the receptacle, the structure and the exposed portion of the electrode trace 15 come into contact—likewise, the contact breaks if the electrode portion 11 is decoupled from the interconnect portion 12. While in FIG. 2 and the FIGURES below, the connectors 25 are represented as female and the further connectors 26 are represented as male in the mating, in a further embodiment, the connectors 25 could be male and the further connectors 26 female.

In the embodiment shown with reference to FIG. 2, the total thickness of the connector 10 when the electrode portion 11 is engaged to the interconnect portion 12 can be about 1.5 mm. The thickness of at most about 1.5 mm is also achievable for the embodiments described below. The structure can be thinner than 1.5 mm with a customer design and fabrication of the locking elements. This thickness can meet a requirement for embedding the connector to a wall of a smart mouthguard, as described below with reference to FIG. 2.

Figure 3:
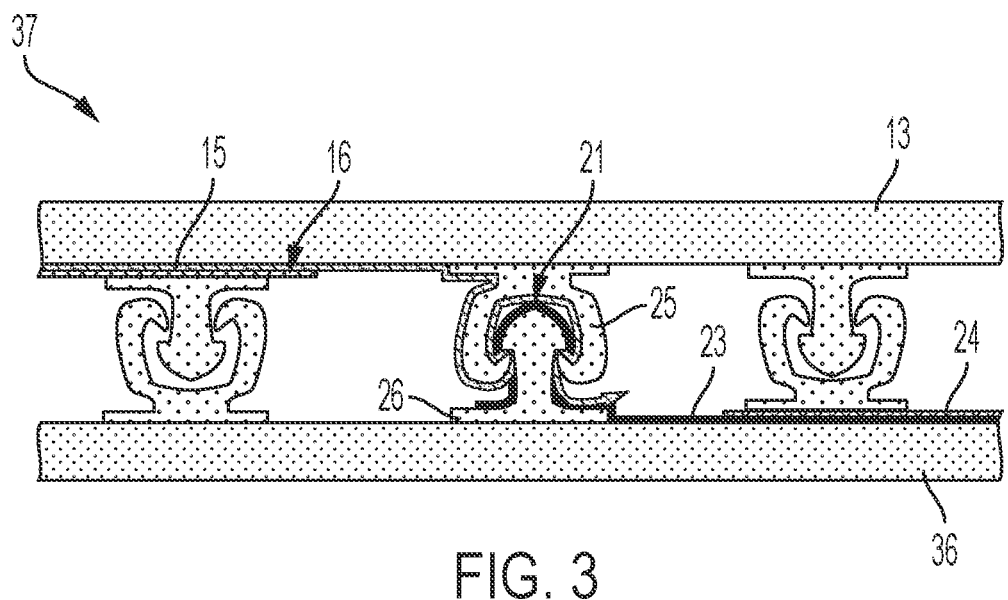
FIG. 3 is a cross-section of the interlock of the multi-part sensing electrode connector 10 of FIG. 1 in accordance with a further embodiment.

The interfacing of the exposed portion of an electrode trace 15 and a contact surface 21 does not have to the interface between a connector 25 and a further connector 26. FIG. 3 is a cross-section of the interlock 37 of the multi-part sensing electrode connector 10 of FIG. 1 in accordance with a further embodiment. As can be seen with reference to FIG. 3, the exposed portion of the electrode trace 15 extends outside of the cavity of the connector 25 and comes into contact with a portion of the contact surface that is not wrapped around the portion of the protrusion that entered into the cavity. This embodiment does not require pressing the electrode trace 15 through the flexible substrate 13, which can make the connector 10 easier to manufacture and more reliable.

Figure 4:
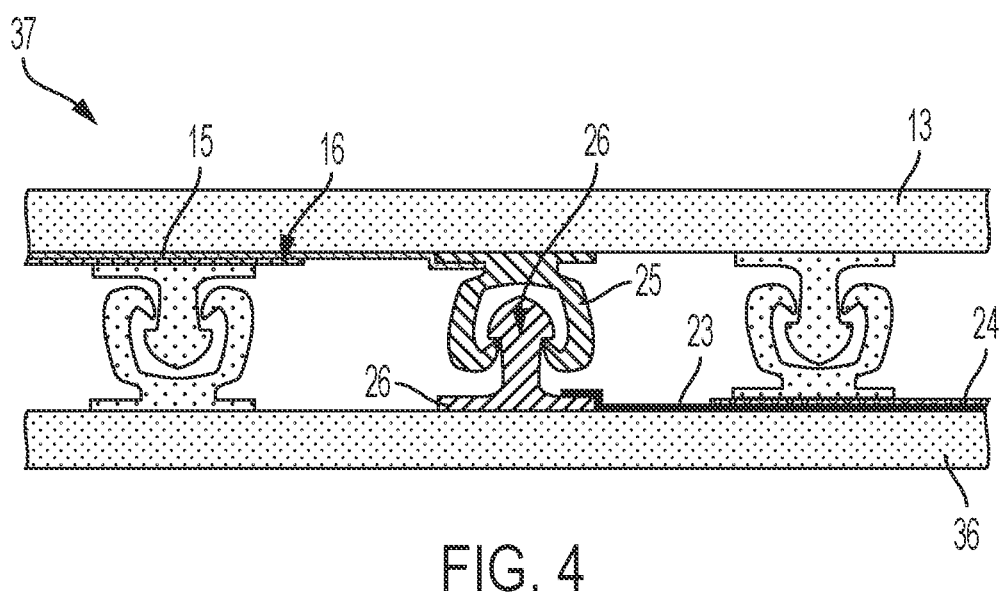
FIG. 4 is a cross-section of the interlock of the multi-part sensing electrode connector of FIG. 1 in accordance with a still further embodiment.

An exposed portion of an electrode trace 15 does not have to physically touch a contact surface 21 in order to be electrically interfaced to that contact surface, as can be seen with reference to FIG. 4. FIG. 4 is a cross-section of the interlock 37 of the multi-part sensing electrode connector 10 of FIG. 1 in accordance with a still further embodiment. At least a part of both the connectors 25 and the further connectors 26 can be made of an electrically conductive material, such as metal, electrically conductive plastic, or electrically conductive rubber, though still other materials are possible. In a further embodiment, the connector 25 and the further conductive can be made of a polymer or other insulating material that is coated with metal or another conductive material. Thus, as can be seen with reference to FIG. 4, the exposed portion of the electrode trace 15 can simply touch the connector 25 that is mated to a further connector 26 to be electrically to a contact surface 21 that touches the further connector 26.

Figure 5:
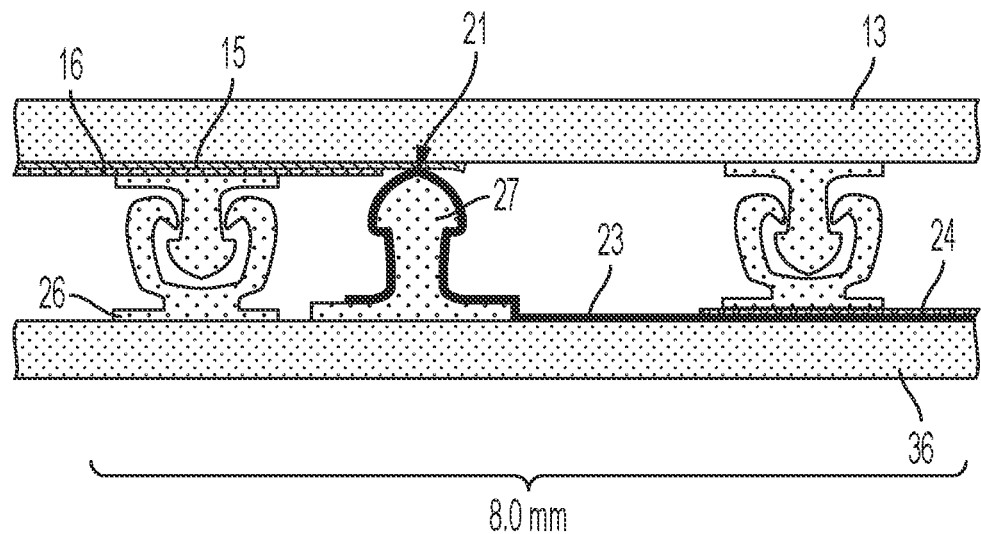
FIG. 5 is a cross-section of the interlock of the multi-part sensing electrode connector of FIG. 1 in accordance with a still further embodiment.

An exposed portion of an electrode trace 15 or the contact surface 21 can be located on surfaces other than a connector 25 or a further connector 26 and still interface with each other, as can be seen with reference to FIG. 5. FIG. 5 is a cross-section of the interlock 37 of the multi-part sensing electrode connector 10 of FIG. 1 in accordance with a still further embodiment. As can be seen with reference to FIG. 5, a protrusion 27 that does not mate a connector 25 can be formed on the interconnect portion 12 and the contact structure 21 can be positioned on the protrusion 27 (such as using attachment techniques described above). An exposed portion of an electrode trace 15 is similarly positioned on the surface of the opposite side 17 of the electrode portion 11 (such as using techniques described above) at a point where when the connectors 25 mate the further connectors, the exposed portion of the electrode trace 15 comes into contact with a contact structure 21 positioned on the protrusion 27. In this arrangement, the total lateral dimension of the connector 10 (with both parts 11, 12 engaged to each other) can be reduced to less than 8 mm or shorter.

Figure 6:
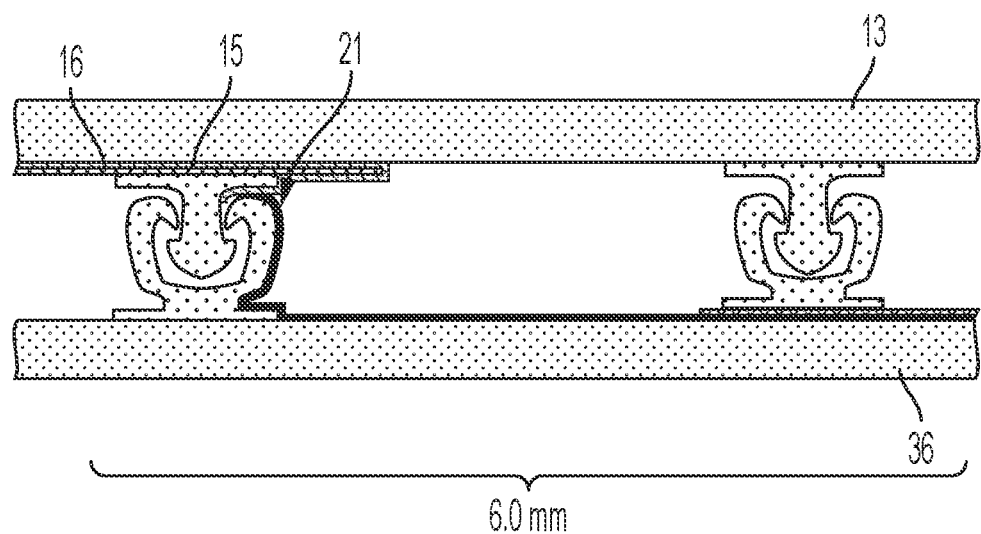
FIG. 6 is a cross-section of the interlock of the multi-part sensing electrode connector of FIG. 1 in accordance with a still further embodiment.

An exposed portion of an electrode trace 15 and the contact surface 21 can also be positioned on outer edges of a connector 25 and a further connector 26 respectively and not on the parts of the connector and the further connector 26 that participate in the mating, as can be seen with reference to FIG. 6. FIG. 6 is a cross-section of the interlock 37 of the multi-part sensing electrode connector 10 of FIG. 1 in accordance with a still further embodiment. When the connector 25 and the further connector 26 mate, the exposed portion of an electrode trace 15 and the contact surface 21 their positioning on the outer edges still allows the contact portion to come into contact with each other. In this arrangement, the total lateral dimension of the connector is reduced to less than 8 mm.

Figure 7A:
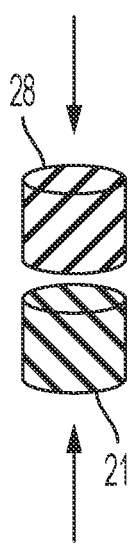
FIG. 7A is an illustration showing the contact structure and the standalone structure in accordance with one embodiment.

As mentioned above, the contact structures 21 could be grouped together on a contact protrusion 22. In a further embodiment, each contact structure 21 could be a standalone structure 21 and the exposed portion of a circuit trace could likewise be connected to a standalone structure 28 that could interface with the contact structure 21. Both the contact structure 21 and the standalone structure 28 could be made of an elastic, electrically-conductive material, such as electrically conductive polymer (such as plastic) or electrically conductive rubber, though other materials are also possible. FIG. 7A is an illustration showing the contact structure 21 and the standalone structure 28, in accordance with one embodiment. While the structures 21, 28 are shown as being cylindrical with reference to FIG. 7A, in a further embodiment, other shapes of the structures 21, 28 are possible, such as a snap or a spring contact, are also possible.

Figure 7B:
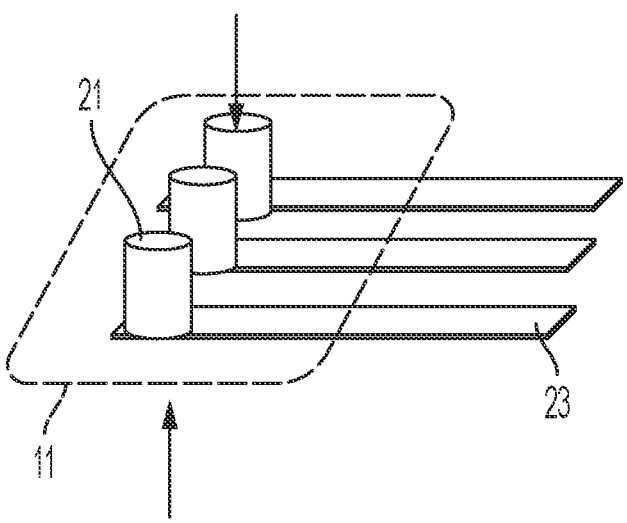
FIG. 7B is a diagram illustrating the mating of multiple contact structures to the elements of the electrode portion in accordance with one embodiment.

When the connectors 25 mate to the further connectors 26, the contact structure 21 comes into contact with the standalone structure 28, interfacing the electrode trace 15 to the contact surface 21. FIG. 7B is a diagram illustrating the mating of multiple contact structures 21 to the elements of the electrode portion 11 in accordance with one embodiment.

Figure 8:
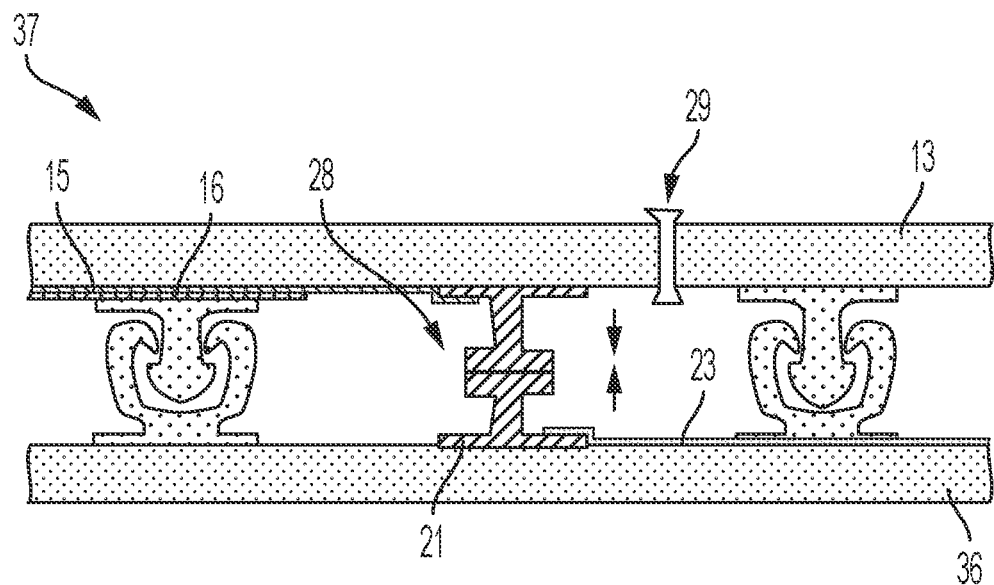
FIG. 8 is a cross-section of the interlock of the multi-part sensing electrode connector of FIG. 1 in accordance with a still further embodiment.

While the interlock portion prevents the exposed portion of the electrode traces 15 and the contact structures 21 from being exposed to liquid, the strength of the seal formed by the interlock and isolation from the ambient environment could be increased by removing gases from the interlock formed by the enclosure 19 and the further enclosure 20. Such removal can be accomplished by introducing a one-way valve through which air and any other gases could be removed from the interlock. FIG. 8 is a cross-section of the interlock 37 of the multi-part sensing electrode connector 10 of FIG. 1 in accordance with a still further embodiment. As can be seen with reference to FIG. 8, the one-way valve 29 can be present in the substrate 13 of the electrode portion 11 and any gases that are trapped within the interlock upon the mating of the connectors 25 to the further connectors 26 can be removed through the one-way valve 29 by pushing the contact structure 21 against the structure 28 interfaced to the exposed portion of an electrode trace 15, thus allowing for a more reliable electrical interface and absence of interference from any gases that could be present in the ambient environment.

Figure 9:
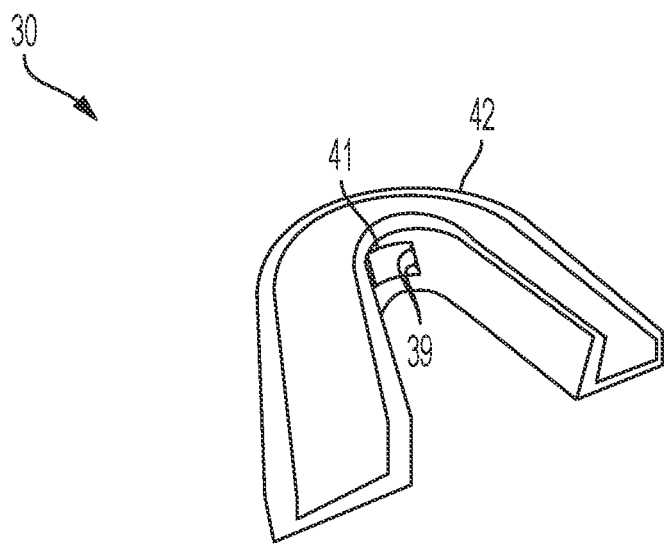
FIG. 9 is a diagram illustrating a smart mouth guard into which a connector 10 can be inserted in accordance with one embodiment.

As mentioned above, the connector 10 can be integrated into an embedded a system 10 that would utilize the sensor electrodes 14 to collect data regarding the ambient environment. An example, of such an environment can be a human body, with the connector being integrated into a physiological monitor, with one example of such monitor being a smart mouth guard. FIG. 9 is a diagram illustrating a smart mouth guard 30 into which a connector 10 can be inserted in accordance with one embodiment. The connector 10 is not inserted into the mouth guard 30 shown with reference to FIG. 9 and the receptacle 41 into which the connector 10 can be inserted is visible with reference to FIG. 9. The receptacle 41 includes contacts 39 that can interface with the conductive traces 23 of the interconnect portion 12 when the connector 10 is inserted into the receptacle 41. As can be seen with reference to FIG. 9, both the housing 42 of mouth guard 30 and the receptacle 41 are curved, requiring the flexible substrates 13, 36 of the electrode portion 11 and the interconnect portion to fit within the receptacle 41. As the smart mouth guard 10 is curved, the flexibility of the substrate 13 of the electrode portion 11 and the substrate 36 of the interconnect portion 12 is necessary to allow for the connector to fit into a receptacle in the housing of the guard 30. In one embodiment, the interconnect portion 12 can be permanently embedded within the receptacle 41 of the mouth guard 30, such as being built within the receptacle 41 for the connector within the guard 30, and the electrode portion 11 can be disposable after a single use. Having the electrode portion 11 disposable allows to use a fresh electrode 11 for each measurement, which is useful to prevent incorrect sensed data caused by degradation of electrodes 14 due to exposure to the contents of the human mouth. The disposable electrode portion 11 also allows for easy cleaning of the mouth guard 30 for transfer to a different user. In a further embodiment, the interconnect portion 12 could also be removable from the mouth guard 30, allowing to replace the interconnect portion if one wears out. The removable interconnect portion 12 could also transferrable between different mouth guards 30 of the same design. In this embodiment, the total lateral dimension of the connector 10 is less than 9 mm. Further, as both portions 11, 12 are flexible, the tolerances for the design do not have to be tight as the portions 11, 12 have a certain robustness to misalignment.

Figure 10:
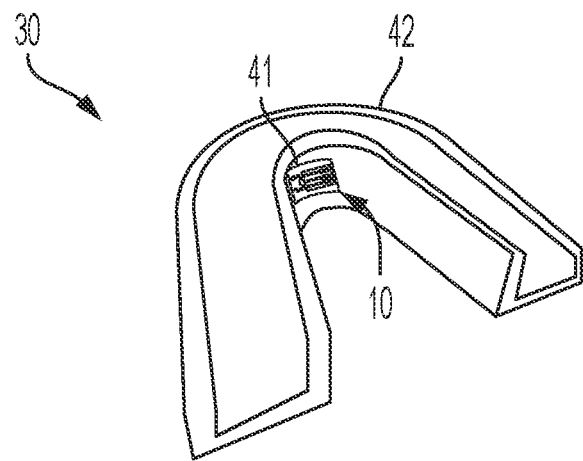
FIG. 10 is a cross-sectional view of a portion of the mouth guard in which the connector is embedded.
Figure 11:
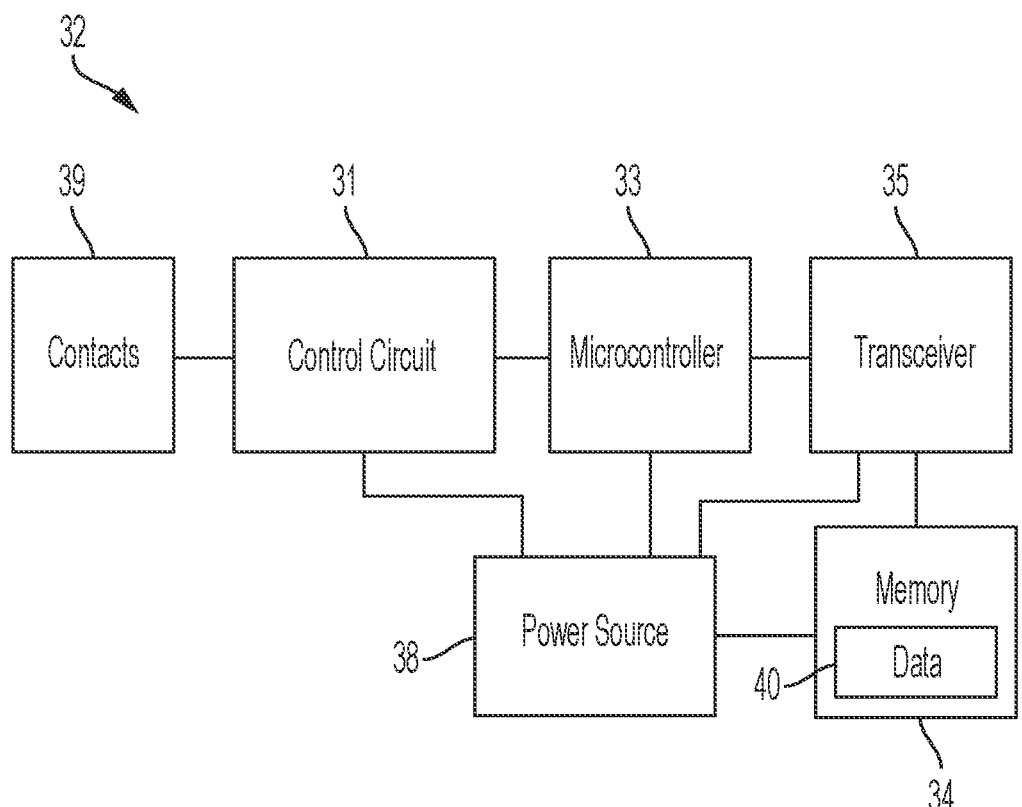
FIG. 11 is a diagram illustrating circuitry of the smart mouth guard 30 in accordance with one embodiment.

The connector 10 within the mouth guard allows to interface the electrodes 14 to a control circuit within the mouth guard, as shown with reference to FIG. 9. FIG. 10 is a diagram of the smart mouth guard 30 of FIG. 9 with a connector 10 inserted in accordance with one embodiment. The control circuit 31 can be a potentiostat, though other kinds of control circuits 31 are also possible. The control circuit 31 in turn is interfaced to other circuitry of the smart mouth guard 30. FIG. 11 is a diagram illustrating circuitry 32 of the smart mouth guard 30 in accordance with one embodiment. In addition to the control circuit 31 that interfaces to contacts 39 that in turn connect to conductive traces 23 (thus ultimately interfacing to the electrodes 14), the circuitry 32 includes a microcontroller 33. The control circuit 31 is interfaced to the microcontroller 33 and provides the sensed data to the microcontroller 33, which can optionally perform processing of the data and store the data 40 (after the optional processing) in a memory 34. The circuitry 32 further includes a wireless transceiver 35 (such as a Bluetooth® Low Energy transceiver, though other kinds of transceivers 35 are also possible) interfaced to the microcontroller 33. The microcontroller 33 uses the wireless transceiver 35 to wirelessly send the collected data to a remote device, such as a server that performs further processing of the collected data. The circuitry further includes a power source 38 (such as a battery) that powers the micro-controller 33, the wireless transceiver 35, the memory 34, the control circuit 31, and any other components of the mouth guard 30 requiring power. Other components of the circuitry 30 are also possible.

While the invention has been particularly shown and described as referenced to the embodiments thereof, those skilled in the art will understand that the foregoing and other changes in form and detail may be made therein without departing from the spirit and scope of the invention.

What is claimed is:

1. A multi-part sensing electrode connector, comprising:
   an electrode portion comprising:
   a flexible substrate;
   one or more electrodes positioned on a side of the flexible substrate that is configured to be exposed to an ambient environment;
   one or more electrode traces, one portion of each electrode trace connected to one of the electrodes and a further portion of that electrode trace is positioned on the side of the flexible substrate that is opposite to the side on which the electrodes are positioned;
   one or more connectors positioned on the side of the flexible substrate that is opposite to the side on which the electrodes are positioned, each connector shaped to detachably mate to a further connector positioned on an interconnect portion; and
   an enclosure of the further portions of the electrode traces, wherein the connectors are comprised at least one of within the enclosure and/or on the enclosure; and
   the interconnect portion comprising:
   a further flexible substrate;
   one or more further connectors positioned on a side of the further flexible substrate;
   one or more electrically conductive contact structures positioned on the same side of the further flexible substrate as the one or more further connectors are positioned, wherein the contact structures electrically interface with the further portions of the one or more of the electrode traces when the connectors mate the further connectors;

one or more interconnect traces, each interconnect trace interfaced to one of the contact structures and configured to interface the contact structures to an external device when the interconnect portion and the electrode portion are inserted into the external device; and a further enclosure formed on the same side of the further flexible substrate as the one or more further connectors and the contact structures, wherein the further connectors are at least one of within the further enclosure and/or on the further enclosure, wherein the enclosure and the further enclosure form an interlock that insulates the further portions of the electrode traces and the contact structures from the ambient environment when the connectors are mated to the further connectors, and wherein the external device is configured to sense data regarding the ambient environments via one or more of the electrodes when the connectors are mated to the further connectors and the interconnect portion and the electrode portion are inserted into the external device.

2. A multi-part sensing electrode connector according to claim 1, wherein a portion of the electrode traces are positioned on the flexible substrate side and at least a portion of the interconnect traces are positioned on the further flexible substrate side, further comprising:

a layer of electrically insulating material covering the electrode traces on the flexible substrate side; and a further layer of further electrically insulating material covering the interconnect traces on the further flexible substrate side.

3. A multi-part sensing electrode connector according to claim 1, wherein the external device comprises a control circuit that senses the data.

4. A multi-part sensing electrode connector according to claim 3, wherein the external device is a mouth guard, the ambient environment is a mouth of a person, and the sensed data comprises biomarker data associated with the person.

5. A multi-part sensing electrode connector according to claim 1, wherein the interconnect portion and the electrode portion flex to accommodate a curved shape of a receptacle within the external device.

6. A multi-part sensing electrode connector according to claim 1, wherein the electrode traces pass through the flexible substrate.

7. A multi-part sensing electrode connector according to claim 1, wherein the flexible substrate comprises plastic.

8. A multi-part sensing electrode connector according to claim 1, wherein at least one of the contact structures comprises metal foil.

9. A multi-part sensing electrode connector according to claim 1, wherein at least one of the contact structures comprises an electrically conductive coating.

10. A multi-part sensing electrode connector according to claim 1, wherein:

one of the connectors comprises a cavity and the further portion of least one of the electrode traces is positioned along a portion of a surface of the cavity; and one of the further connectors comprises a protrusion shaped to snugly fit within the cavity, at least one of the contact structures wrapped around at least a portion of the protrusion.

11. A multi-part sensing electrode connector according to claim 1, wherein:

one of the connectors comprises a cavity and the further portion of least one of the electrode traces is positioned along an entirety of a surface of the cavity; and one of the further connectors comprises a protrusion shaped to snugly fit within the cavity, at least one of the contact structure wrapped around at least a portion of a surface of the protrusion.

12. A multi-part sensing electrode connector according to claim 1, wherein at least a portion of one of the connectors and at least a portion of the further connector that mates with that one connector each are electrically conductive and wherein one of the contact structures and the further portion of one of the electrode traces electrically interface via the electrically conductive connector and further connector.

13. A multi-part sensing electrode connector according to claim 12, wherein the electrically conductive connector and further connector each comprise at least one of electrically conductive polymer and electrically conductive rubber.

14. A multi-part sensing electrode connector according to claim 11, further comprising:

a protrusion positioned on the interconnect side; and one of the contact structures wrapped around at least a portion of the protrusion, wherein the another portion of the one electrode trace is adjacent to the opposite electrode portion side and comes into contact with the contact structure when the connectors mate to the further connectors.

15. A multi-part sensing electrode connector according to claim 1, wherein the further portion of one of the electrode traces is positioned on an outer surface of one of the connectors and one of the contact structures is positioned on an outer surface of the further connector that mates the one connector.

16. A multi-part sensing electrode connector according to claim 1, further comprising:

an elastic, electrically conductive structure different than one of the connectors and formed on the flexible substrate opposite side, the structure interfaced to the further portion of one of the electrode traces, wherein one of the contact structures comprises a further elastic structure different from the further connectors formed on the interconnect portion side and wherein the structure and the further structure mechanically interface when the connectors mate the further connectors.

17. A multi-part sensing electrode connector according to claim 16, further comprising:

a one-way valve formed in the electrode portion, wherein the mating of the connectors and the further connectors causes an expulsion of air from the interlock created by the enclosure and the further enclosure.

18. A smart mouth guard with a disposable electrode portion, comprising:

a mouth guard comprising:

a curve-shaped housing comprising a receptacle shaped to receive an electrical connector and to electrically interface the electrical connector to a control circuit;

the control circuit configured to sense electrochemical data via one or more electrochemical electrodes of the electrical connector exposed to an inside of a person's mouth;

a microcontroller interfaced to the control circuit and configured to receive the measured data;

a wireless transceiver interfaced to the microcontroller and configured to transmit the sensed data to a remote device;

the electrical connector, comprising:

an electrode portion comprising:

a flexible substrate;

one or more electrochemical electrodes positioned on a side of the flexible substrate that is configured to be exposed to an ambient environment;

one or more electrode traces, one portion of each electrode trace connected to one of the electrochemical electrodes and a further portion of that electrode trace positioned on the side of the flexible substrate that is opposite to the side on which the electrochemical electrodes are positioned;

one or more connectors positioned on the side of the flexible substrate that is opposite to the side on which the electrodes are position, each connector shaped to detachably mate to a further connector positioned on an interconnect portion; and an enclosure of the further portions of the electrode traces, wherein the connectors are at least one of within the enclosure and/or on the enclosure; and the interconnect portion comprising:

a further flexible substrate;

one or more further connectors positioned on a side of the further flexible substrate;

one or more electrically conductive contact structures positioned on the same side of the further flexible substrate as the one or more further connectors are positioned, wherein the contact structures electrically interface with the further portions of the one or more of the electrode traces when the connectors mate the further connectors;

one or more interconnect traces, each interfaced to one of the contact structures and configured to interface the contact structures to the control circuit when the interconnect portion is integrated into the receptacle; and a further enclosure formed on the same side of the interconnect portion as the one or more further connectors are positioned and surrounding the contact structures, wherein the enclosure and the further enclosure form an interlock that insulates the further portions of the electrode traces and the contact structures from the ambient environment when the connectors are mated to the further connector.

19. A smart mouth guard according to claim 18, wherein the electrochemical data comprises biomarkers of the person.

20. A multi-part sensing electrode connector according to claim 18, wherein a portion of the electrode traces are positioned on the flexible substrate side and at least a portion of the interconnect traces are positioned on the further flexible substrate side, further comprising:

a layer of electrically insulating material covering the electrode traces on the flexible substrate side; and a further layer of further electrically insulating material covering the interconnect traces on the further flexible substrate side.

* * * * *